Feb. 15, 1966 H. A. MAHONY 3,235,374
SYSTEM AND PROCESS FOR THE DIRECT REDUCTION OF IRON ORE
Filed July 11, 1962 3 Sheets-Sheet 1

INVENTOR.
Harold A. Mahony
John Mahony
BY
Attorney

Feb. 15, 1966  H. A. MAHONY  3,235,374
SYSTEM AND PROCESS FOR THE DIRECT REDUCTION OF IRON ORE
Filed July 11, 1962  3 Sheets-Sheet 2
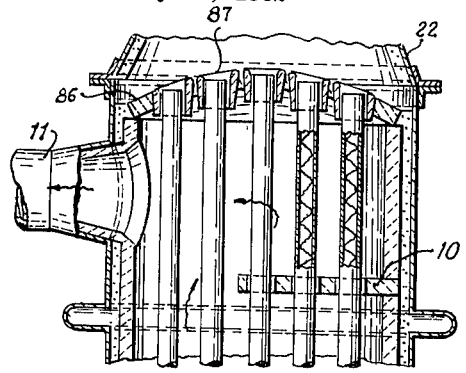
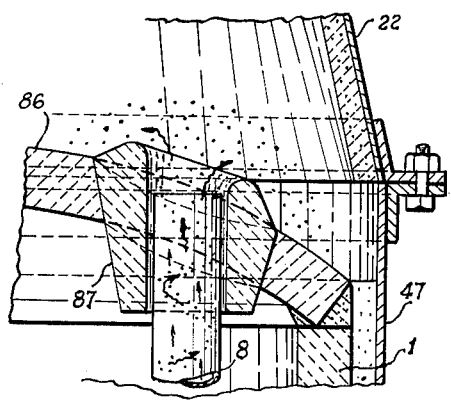
Fig-3
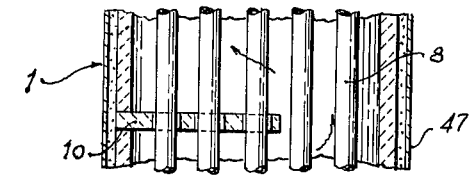
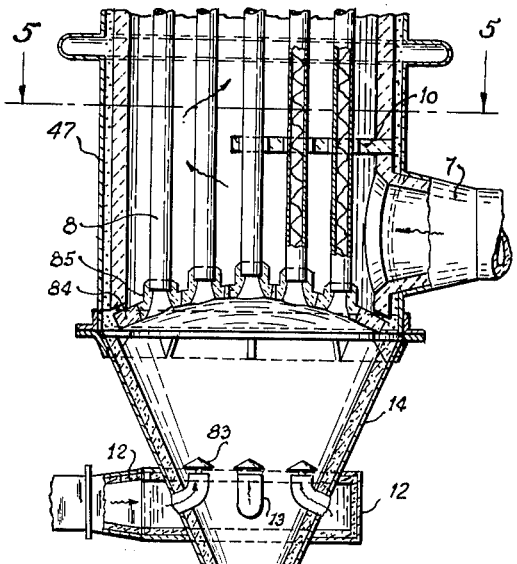
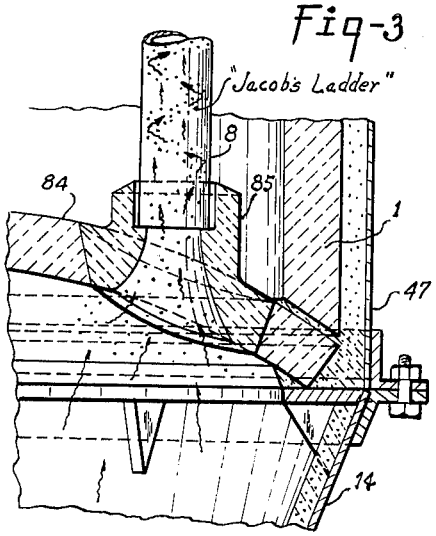
Fig-4
Fig-2
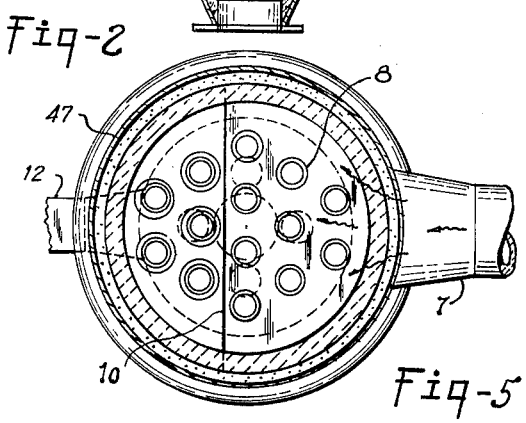
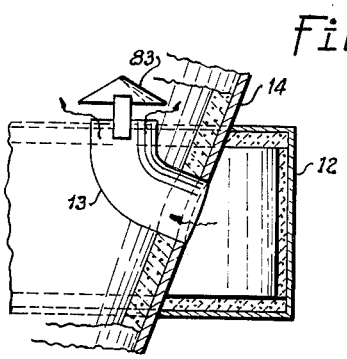
Fig-5
Fig-6
INVENTOR.
BY Feb. 15, 1966     H. A. MAHONY     3,235,374
SYSTEM AND PROCESS FOR THE DIRECT REDUCTION OF IRON ORE
Filed July 11, 1962     3 Sheets-Sheet 3
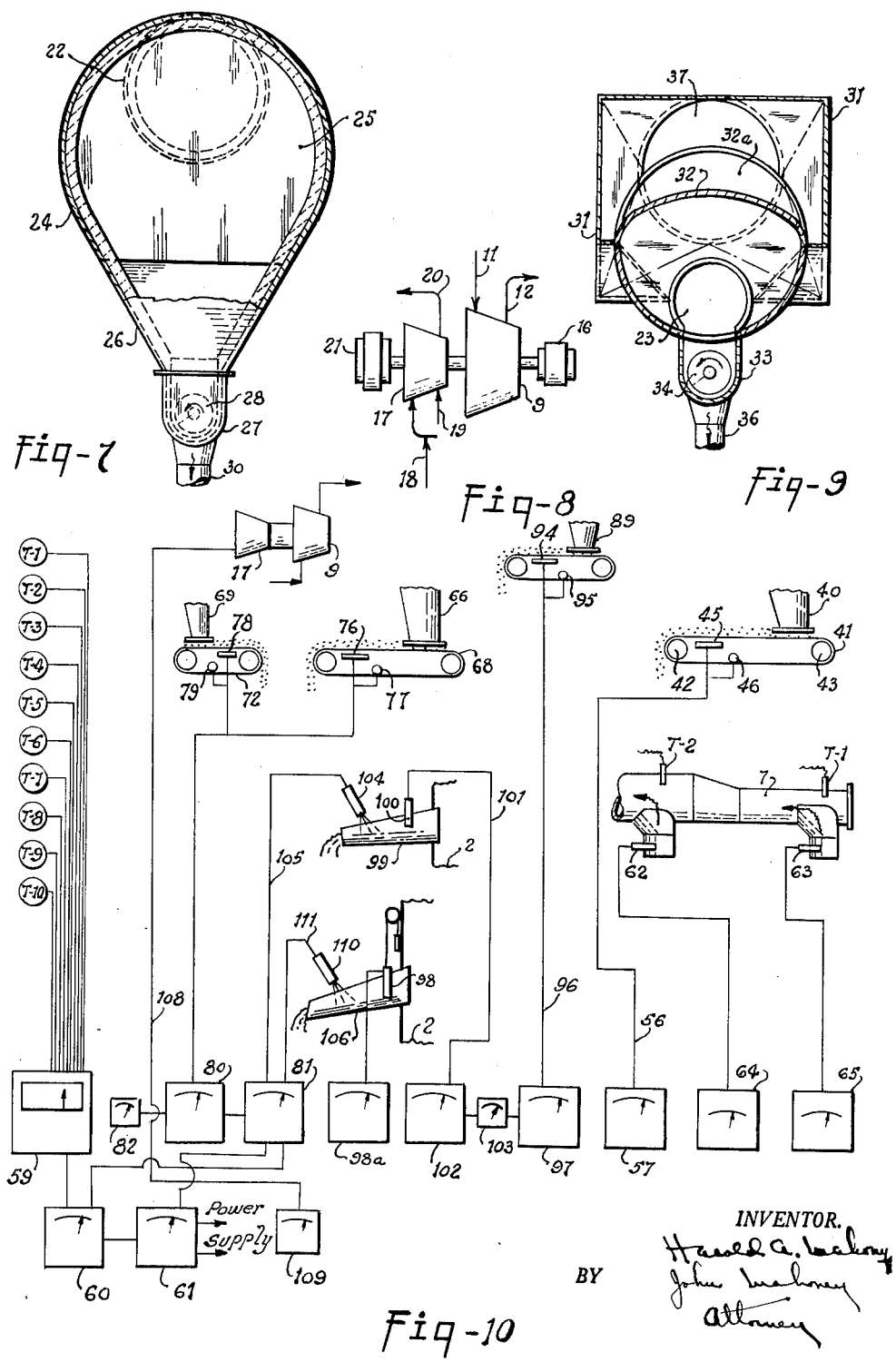
INVENTOR.

3,235,374
SYSTEM AND PROCESS FOR THE DIRECT
REDUCTION OF IRON ORE
Harold A. Mahony, 1827 Taylor Road,
East Cleveland 12, Ohio
Filed July 11, 1962, Ser. No. 209,115
19 Claims. (Cl. 75—26)

The present invention relates to an improved process and system for reducing iron ore to the metallic state, such as natural or beneficiated iron ores, to produce iron or a commercial grade of steel. More particularly, it relates to a system for and to a method of reducing natural ores containing fifty percent or more of metallic iron, or ores which have been beneficiated to increase the iron content to approximately fifty percent or more, As is now well known, iron ores are often transported comparatively long distances from mines to blast furnaces wherein the iron is reduced to a metallic state. To lessen the high cost of transporting low grade iron ores utilized for producing iron or steel, they may be subjected to a beneficiation process at the mine site in which the iron content is increased to fifty percent or more. Because of the comparatively large amount of gangue material that is combined or associated with such beneficiated ores, however, they have heretofore been reduced to a metallic state in a blast furnace.

In accordance with the present invention, an improved process and system is provided in which natural or beneficiated iron ores containing approximately fifty percent or more of iron, are treated in a closed or substantially closed system in which they are subjected to a reducing and smelting operation to provide a commercial grade of steel or iron in which the carbon may range up to 4%. In a more limited sense, however, my improved process and system is designed to provide iron or steel at the mine site from raw ore or from ores which have been subjected to the usual beneficiation processes. According to my process, the raw ore, either in its natural or beneficiated state, may be reduced to the metallic state at the mine site without the use of a blast furnace. The metallic ore produced may, if desired, be further refined in the usual open hearth or electric furnace to provide steel or iron having a specified amount of carbon. In my improved system, two interconnected hearths or furnaces 2 and 3 are provided, one of which is a carbonizing hearth by means of which the desired amount of hot carbon monoxide gas may be generated to reduce the raw iron ore while the other is a deoxidizing hearth having a basic lining in which the metallic iron is melted and separated from its gangue. A reactor is also provided having a tubular section in which means are provided to force a charge material consisting of a finely divided raw ore and a carbonaceous material through the tubular section in a step by step sequence and to simultaneously reduce the raw ore by means of a mixture of hot carbonaceous gases consisting principally of carbon monoxide but which contains a small proportion of carbon dioxide.

In the hearths, induction currents maintain constant agitation of heats, $FeC_3$ migrates constantly between hearths 3 and 2 where dissolved liquid carbon is given up to the slag and transformed into CO gas along with $CO_2$ given up by the slag. CO gas is essentially generated in hearth 3 by introduction of a carbonaceous material without the addition of oxygen or outside air. CO gas may be piped directly to the reactor unit. $CO_2$ cannot attack carbon in hearth 3 as oxygen or free air is not required for combustion. Phosphorus can only enter the system through the flux and raw ore. All of the phosphorus which is present, however, may enter the iron.

The carbonaceous material added to hearth 3 is almost immediately taken up by the molten iron and due to the rapid stirring action migrates to hearths. In my improved process, the reaction of reduction proceeds rapidly at a temperature lower than is necessary when carbon is present in the charge and therefore has a decided advantage over the so-called ore-solid carbon processes.

The maintenance of a reducing atmosphere is not only very difficult with present arc furnaces but is almost impossible, except with crucible and muffle furnaces. The induction hearths of my system, however, completely meets these requirements because a reducing or oxidizing atmosphere can be obtained as desired. With the arc furnace on the other hand, while reduction processes take place very well, oxidation proceeds very slowly due to the reducing action of the electrodes, and if an increased amount of oxidizing material is used, the consumption of the electrodes increases which increases the cost of the process.

It is recognized that the solid phase reactions between carbon and iron occur but in a minor degree when reducing gases are present because if at atmospheric pressure both carbon and CO are present in the system, over 90 percent of the iron oxide will be reduced through the agency of the gas phase reaction of CO and less than 10 percent of the iron oxide is reduced by the carbon in the solid phase.

As the carbonaceous material, charcoal is almost an ideal fuel for induction furnace smelting. It contains only a few hundreths of one percent of sulphur whereas coke contains approximately one percent and when charcoal burns only about one percent of ash remains whereas when coke burns approximately 10% of ash remains. Moreover, the ash from charcoal consists of a large amount of lime and alkalies which supplies part of the flux for the gangue of the ore whereas the ash from coke is composed principally of silica which must be fluxed with additional basic material. The fuel consumed per ton of iron is also less with charcoal than with coke and charcoal is electrically resistive and has a high power factor co that more electrical energy is liberated in the furnace than when coke is used.

Because of the fineness of the ore and carbonaceous material, a vapor phase reaction takes place in the reactor between the molecules or atoms of the carbon monoxide gas and the finely divided ore, thus promoting nucleation or a triggering-off reaction from the nuclei of the iron ore. The reaction takes place as a consequence of collisions of the various reactants. Hence, the velocity with which the reactants are consumed is proportional to their concentrations.

Considering the temperature at which CO is stable, the reaction:

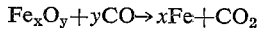
$$Fe_xO_y + yCO \rightarrow xFe + CO_2$$

takes place on the surface of a piece or particle of ore that has reached this zone. The $CO_2$ formed on the surface is immediately reduced to CO as it encounters carbon, and then the *overall* reaction is:

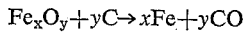
$$Fe_xO_y + yC \rightarrow xFe + yCO$$

since only CO is in the gas phase. Considering a portion of the space containing ore and carbon we may express the reaction:

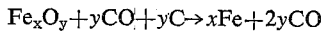
$$Fe_xO_y + yCO + yC \rightarrow xFe + 2yCO$$

which indicates that according to the formula there need be no direct action of the carbon upon the ore. The split-off carbon is considered to be the carrier of direct reduction in this invention, the carbon being formed in the decomposition reaction:

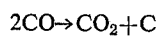
$$2CO \rightarrow CO_2 + C$$

Very strongly endothermic reactions occur in the charcoal and slightly exothermic reactions occur in the ore. In the lower part of the reactor, the removal of the oxygen from the ore has proceeded so far that only FeO is present and the reaction therefore is:

$$FeO + CO \rightarrow 3310 \text{ Kcal./Kmol} \rightarrow Fe + CO_2$$

The CO which here reaches the surface of the ore will have no occasion to split into $CO_2$ and C depositing nascent C, which in turn could react with the oxygen in the ore.

It is therefore an object of my invention to provide an improved system and an improved process of treating natural or beneficiated raw iron ore to produce iron or a commercial grade of steel.

Another object of my invention is to provide a substantially closed reduction system including two interconnecting induction hearths, one of which is utilized to provide a reducing gas and the other of which is utilized as a smelting hearth.

A further object of my invention is to provide an improved system and a process of smelting raw iron ore which includes a reactor having a tubular section and in which means are provided to cause a charge material consisting of a mixture of finely divided raw iron ore and a finely divided carbonaceous material to be directed into the lower portion of the reactor and in which means are also provided to cause the charged raw material to flow upwardly through the tubular section including a hot reducing gas consisting principally of carbon monoxide which is under such pressure that the charge material ascends upwardly through the tubular section in a continuous step by step sequence.

Another object of my invention is to provide an improved system including a reactor and a combination of two hearths for smalting raw iron ores and melting the iron in which means are provided to automatically as well as manually adjust or regulate the amount of charge material and flux to be fed into the system, and means by which the temperature of the molten metal in the hearths and the temperature of the hot reducing gas generated in the system may be automatically or manually controlled.

A further object of my invention is to provide an improved process of producing iron or a commercial grade of steel at the mine site from raw iron ore or from beneficiated iron ores containing at least 50% iron in which the iron or steel produced is substantially free from sulphur, and which may therefore be refined in an open hearth or electrical furnace without further addition of iron that is comparatively free from impurities.

A still further object of the invention is to provide an improved process in which a charge consisting of raw iron ore and a carbonaceous material, both in a micro or an ultra micro state of fineness, are subjected to the mass flow of a hot carbon monoxide gas, thereby causing reduction of the iron ore to the metallic state by vapor phase diffusion. Iron ore of such fineness is commercially available at the present time.

Other objects and advantages of my invention will be better understood by reference to the accompanying drawings in which:

FIG. 2 is a central sectional view of the reactor showing parts in elevation;

FIG. 3 is an enlarged detail sectional view of the upper portion of the reactor;

FIG. 4 is an enlarged detail view of the lower portion of the reactor;

FIG. 5 is a cross sectional view taken on a plane passing through the line 5—5 of FIG. 2, looking in the direction of the arrows;

FIG. 6 is an enlarged detail view of a portion of a windbox, showing a tuyere leading from the windbox to the lower conical portion of a reactor;

FIG. 7 is partly a sectional and partly an elevational view taken on a plane passing through the line 7—7 of FIG. 1, looking in the direction of the arrows;

FIG. 8 is a diagrammatical view showing the turbine and blower used in my improved system;

FIG. 9 is a cross sectional view with parts in elevation taken on a plane passing through the line 9—9 of FIG. 1, looking in the direction of the arrows; and FIG. 10 is a diagrammatical view illustrating the control means for the system.

Figure 1:
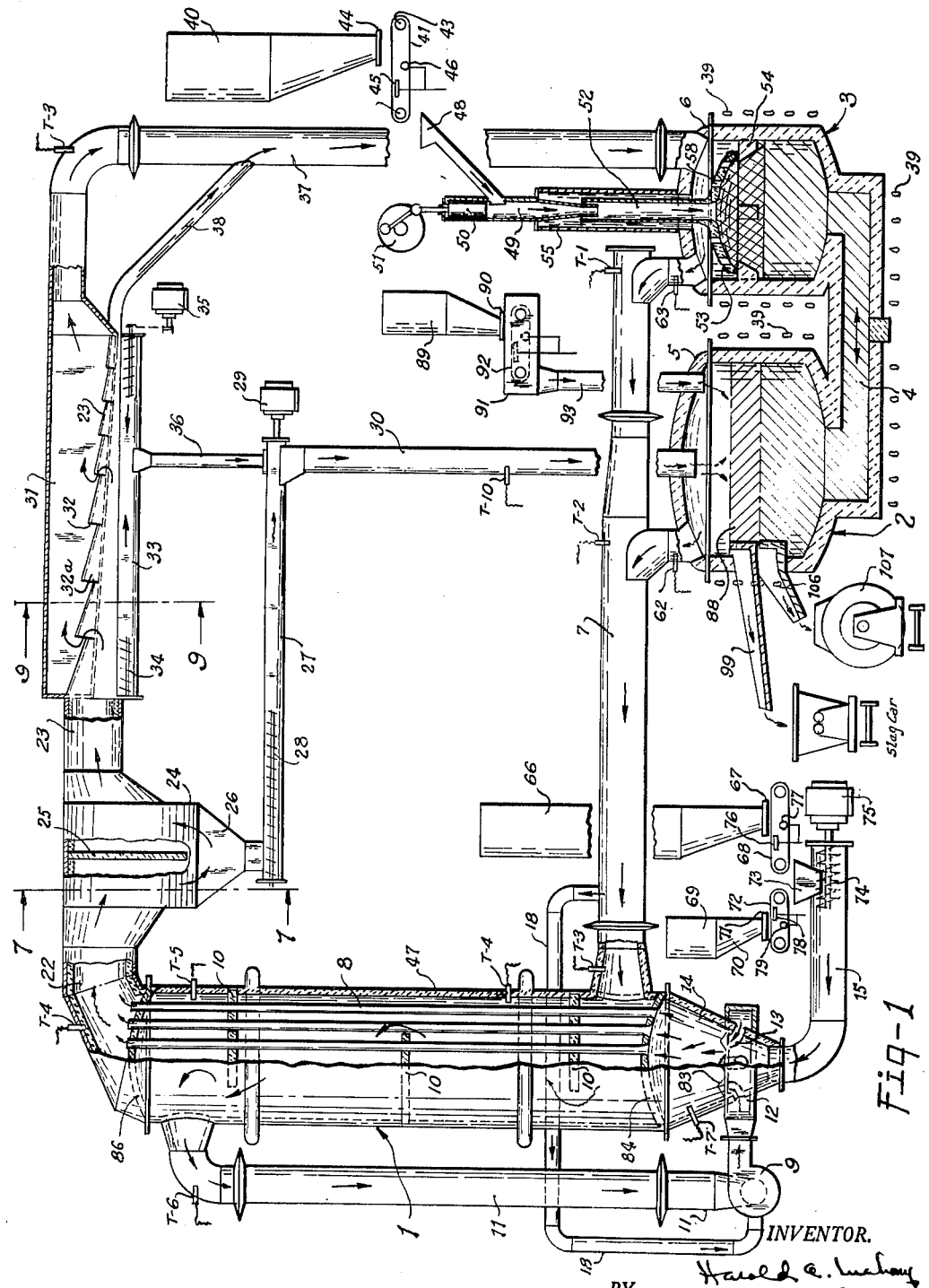
FIG. 1 is an elevational view of my improved system with parts shown in section.

As illustrated in the drawings, my improved system comprises a reactor 1, dual hearths 2 and 3 having their lower sections connected together by a conduit means 4, and having removable covers 5 and 6, respectively.

Hearth 3 is a conbonizing hearth and hearth 2 is smelting and deoxidizing hearth. Hot carbon monoxide gas is evolved in hearth 3 and carbon dioxide gas is evolved in hearth 2 and the mixture of gases flows through conduit means to reactor 1 which includes a tubular section consisting of a plurality of tubes 8 through which a finely divided mixture of raw iron ore and carbonaceous material and the hot carbon monoxide and carbon dioxide gases are forced by blower 9. During the process, the hot mixture of carbon monoxide and carbon dioxide gases are conducted into the lower portion of the tubular section of the reactor and are directed in a circuitous path around baffles 10, thereby heating the tubular section 8. The hot gases then pass out of the upper portion of the tubular section of the reactor through conduit means 11 which is connected to the inlet of blower 9, the outlet of the blower being connected to a windbox 12 from which a series of tuyeres extend into an inverted conical housing 14 which forms the lower portion of the reactor and into which a finely divided mixture of raw iron ore and a carbonaceous reducing material is forced through conduit means 15.

As shown in FIG. 8, a motor 16 is provided to start the blower 9 after which it is rotated by a gas turbine 17, the fuel for which consists principally of carbon monoxide delivered from conduit means 7 through pipe 18 and which is mixed with air passing into the turbine through conduit means 19 to provide a combustible mixture, the products of combustion being exhausted from the turbine through conduit means 20. As shown diagrammatically in FIG. 8, the turbine also drives generator 21 for energizing electrical motors used in the system.

During the passage of the charge material consisting of finely divided iron ore and carbonaceous material and the mixture of hot carbon monoxide and carbon dioxide gases through the tubular section of the reactor, the iron is separated from its gangue and most of the iron oxide is reduced to metallic iron although some iron oxide is present. The products of the reaction and the hot carbon monoxide and carbon dioxide gases pass from the reactor through conduit means 22, one end of which is connected to the reactor and the opposite end of which is connected to one side of a primary separator 24 which has a baffle 25 therein and terminates in an inverted conically-shaped portion 26 which is connected to a conveyor 28. Conveyer 28 is rotated by a motor 29, and consequently, when the gases carrying the reduced iron, iron oxide and gangue strike baffle 25, the predominant portion of the heavy fines fall through the lower portion 26 of the separator into conveyor 28 and are conveyed to a pipe 30 which is connected to hearth 2. The gas stream which consists essentially of hot carbon monoxide continues on in its passage through a conduit means 23, one end of which is connected to the opposite side of separator 24 and the other end of which extends through an opening in a rectangularly-shaped conduit means 31. The lower side portions of conduit means 31 are welded or otherwise secured to conduit means 23 as shown more particularly in FIG. 9 and the portion of conduit means 23 which extends within conduit means 31 is provided with a plurality of steps 32, the face of each of which has an opening 32a therein as shown in FIG. 9 and as the gas stream flows through that portion of conduit means 23 within conduit means 31, the direction of flow of essentially all of the gas therein is reversed and passes through the openings 32a, one of which is in the front face of each of the steps. The reversal of the flow of the gases retards the speed of the gases and additional hot fines deposit out and fall into conveyor 34 which is rotated by a motor 35 and that part of conveyor 34 on one side of a discharge tube 36 is constructed to move the fines in one direction toward tube 36 which communicates with tube 30 and the part of the conveyor on the opposite side of tube 36 is constructed to move the fines in the opposite direction to tube 36. Tube 36 is connected to tube 30 which leads into hearth 2 and substantially all the reduced iron, iron oxide, and gangue from the reactor is conveyed to hearth 2 through tube 30. The hot gases consisting predominantly of carbon monoxide pass through conduit means 31 and pipe 37 to furnace 3 and in a like manner the remainder of the gases which pass through conduit means 23 flow through a conduit means 38 and pipe 37 to hearth 3. Because the system is substantially closed, the hot gases flowing through conduit means 37 to hearth 3 will usually consist of approximately 95% carbon monoxide and 5% carbon dioxide. The carbon dioxide, however, will be converted to carbon monoxide when it enters hearth 3.

In starting the system, an iron charge may be inserted into each of the hearths 2 and 3 when covers 5 and 6 are removed or iron may be left in the hearth from a previous operation. In either case, inductive means is provided to melt the metal in the hearths. As shown, water-cooled copper conductors 39 surround the body portion of hearths 2 and 3 and the interconnecting conduit means 4 and provide an electrical field to melt the charges. Induction currents maintained by these fields cause constant agitation of the molten metal.

Hearth 3 is a carbonizing hearth and means are provided to introduce a carbonizing material therein. For this purpose, a container 40 is provided having a carbonizing material therein which is preferably substantially free from sulphur, such as charcoal, lignite, or peat, and from which a substantial amount of the moisture has been removed. A finely divided carbonizing material, such as charcoal, having a moisture content of not more than 3% to 5% may be used. As shown in FIG. 1 container 40 has a reduced lower portion extending over a motor driven belt 41 trained around rollers 42 and 43 upon which belt the carbonizing material is deposited when a gate 44 in the lower portion of container 40 is open. As shown more particularly in FIG. 10, a scale 45 is provided to weigh the carbonaceous material on belt 41 and a tachometer 46 is provided to transmit the speed impulse of belt 41 to a controller 57.

The carbonizing material flows from belt 41 to a chute 48 which leads into cylinder 49 in which a piston 50 is actuated by a motor driven eccentric 51. Cylinder 49 is tapered inwardly at its lower end portion and extends into the upper end portion of a tube 52 formed of a refractory material, the lower end portion of which terminates within the furnace in a bell-shaped member 53 which rests upon refractory supports 54 extending inwardly from the furnace. A tubular member 55 extending upwardly from furnace 3 makes a tight engaging fit with cylinder 49 to prevent the entrace of extraneous air into the furnace.

For controlling the amount of carbonizing material supplied to hearth 3, dual electrical impulses are transmitted through a conductor 56 as shown in FIG. 10 to a recording controller 57. This controller automatically controls by weight the amount of the carbonizing material supplied to hearth 3. Controller 57 may also be manually operated to control the amount or weight of the carbonizing material supplied to furnace 3. Because hearths 2 and 3 are connected together at their lowermost portions, when the hearths are operating the level of molten iron in both hearths will be the same. In accordance with my invention, the molten iron in the hearths is maintained at a temperature ranging from approximately 2700° to 2900° F.

An essential feature of hearth 2 is that the unreduced parts of the charge unite to form slag which is lighter than the metal or matte so that separation of the two liquids is effected by gravity. It is essential that the slag shall be of such composition as to melt and flow freely at a temperature readily attained in the furnace. It may be necessary, however, to adjust certain other properties of the slag in addition to its melting and flowing temperatures.

The carbonaceous material, such as charcoal, which enters furnace 3 burns to incandescence when it contacts the molten metal charge and lacking free air generates CO gas and deposits liquid carbon in the hot metal bath. Any moisture that is present in the charcoal charge is borken up in the presence of carbon at the high temperature prevailing in the furnace, forming CO and free hydrogen, thus:

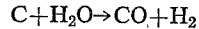
$$C+H_2O \rightarrow CO+H_2$$

The $CO_2$ formed by the combustion of charcoal comes into immediate contact with incandescent particles of charcoal, and is at once resolved into CO by the "carbon transfer," thus:

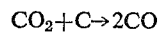
$$CO_2+C \rightarrow 2CO$$

However, the fact hydrogen occurs in gases being generated in hearth 3 would seem to indicate that it does not perform reduction in the process. But while it may not reduce directly, it probably assists in the reduction by diluting the $CO_2$ or even by decomposing it, producing CO, thus:

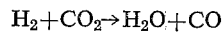
$$H_2+CO_2 \rightarrow H_2O+CO$$

which tends indirectly to facilitate reduction.

The coreless induction hearths utilized in my improved process are not only more efficient than electric arc furnaces but the current induced in the molten metal bath causes an effect which produces movement of the molten metal in the hearths similar to that provided by stirring.

The hearths are connected at their lower portions and molten iron formed in hearth 3 migrates through conduit means 4 to hearth 2 and the carbon which is dissolved therein reduces a portion of the iron oxide in the slag to iron producing additional carbon monoxide gas. In turn, some of the molten iron in hearth 2 migrates to hearth 3 and again reacts with the carbon to form iron carbide. Some carbon passing in the molten iron from hearth 3 to hearth 2 also reacts with the slag and the hot gases therefrom enter conduit means 7. The bell-shaped cap 53 in hearth 3 is provided with openings 58 as shown in FIG. 1 and the generated carbon monoxide gas passing through conduit means 7 to the reactor carries in the gas stream the ash resulting from the burning of the carbonaceous material.

The molten metal in hearths 2 and 3 is maintained at a temperature of approximately 2700° to 2900° F. and the combined gases generated in the hearths flow through pipe 7 to the lower portion of the reactor and consist essentially of 90% to 95% carbon monoxide and 5% to 10% of carbon dioxide. This mixture of hot gases as it leaves the hearths is preferably at a temperature of approximately 2100° F. and thermocouples T–1 and T–2, respectively, are placed above the junction of the gas outlet of hearth 3 and conduit means 7 and above the junction of the gas outlet of hearth 2 and conduit means 7 and the temperature of the gas flowing from each hearth is recorded on a multiple temperature recorder 59. Control means 60 and 61 regulate the amount of electrical energy supplied to hearths 2 and 3. Sampling device 62 located in the gas outlet pipe of hearth 2 and sampling device 63 located in the gas outlet of hearth 3 lead to indicating recorders 64 and 65 which show the amount of gas flowing from each of the furnaces.

As previously stated, the hot gases flowing from the hearths pass into the bottom portion of the reactor causing transfer of heat to the tubular section 8 and then pass out of the upper portion of the reactor and are conducted through pipe 11 to the inlet side of blower 9 which is arranged adjacent to the bottom portion of the reactor and is driven by a gas turbine 17. The outlet side of blower 9 is connected to the windbox 13 and thermocouples T–3, T–4, T–5, T–6, and T–7 are installed within the passage leading from conduit means 7 to and within housing 14 which are connected to the multiple temperature recorder 59 and the desired temperature of the gases are maintained by either automatic or manual control associated with the master temperature recorder to increase or decrease the amount of electrical energy supplied to the hearths. The hot carbonaceous gases passing from blower 9 into the windbox 12 are preferably at a temperature of approximately 1750° to 1800° F. and serve to force a mixture of the finely divided raw ore and carbonizing material in housing 14 through the externally heated tubes 8.

Any convenient means may be provided to force the mixture of iron ore and carbonizing material into housing 14 which constitutes the lower portion of the reactor. As shown, a container 66 for finely divided ore has a reduced bottom portion provided with a gate 67 which is arranged over a belt 68 and a container 69 for the finely divided carbonaceous material has a reduced portion 70 and a gate 71 arranged over a belt 72. One end of belt 68 and one end of belt 72 extend over a chute 73 leading into cylinder 15 in which conveying means 74 is driven by a motor 75. A scale 76 is arranged below the upper portion of belt 68 and a tachometer 77 engages the belt 68 and in a like manner a scale 78 is arranged below the upper portion of belt 72 and a tachometer 79 engages the belt. The finely divided iron ore or finely divided beneficiated iron ore in container 66 having a mesh ranging from approximately minus 200 to minus 325 and the finely divided carbonaceous material in container 69 will flow freely when gates 67 and 71 are open and a quantity of the material is made available upon the moving belts which in turn, it adjusted through recorder controllers 80 and 81 to provide approximately 90% by weight of the ore and approximately 10% by weight of the carbonizing material. The carbonizing material is for the purpose of providing a carbon coat over the siliceous material at the beginning of the reaction in the lower part of the reactor and will of course be varied depending upon the amount of siliceous material that is present. A sufficient amount should be present, however, to coat the siliceous material. For controlling the amount of ore and the amount of carbonizing material that flow into chute 73, dual electrical impulses travel to the recording controller 80 and ore recording controller 81 which are integrated therewith by connection to a ratio setting controller 82. The ratio controller 82 may be manually set as the system requires.

Sufficient gas pressure is provided by blower 9 to enable the hot gases to force the incoming charge of carbonaceous material and iron ore above windbox 12 through the tubular section of the reactor. A series of tuyeres 13 extend from the windbox 12 through openings in the housing 14 and each is provided with a cap 83 to minimize the amount of ore and carbonizing material that may flow back through the tuyeres when the gas pressure is terminated.

The blower 9 may be adjusted to discharge the hot gases at approximately 10 to 35 pounds per square inch depending upon the composition of the iron ore and the rate of flow of the charge material. The gas pressure used should be sufficient to force the mixture of finely divided ore and finely divided carbonaceous material through the tubular section in steps arranged at approximately 45° angles to each other and to furnish the differential pressure required to the hot reducing gases to maintain complete circulation in the system. The conical base of the reactor will remain relatively full of charge material and by integrating the rate of flow of charge material and the pressure of the hot reducing gases, a "Jacob's ladder" effect is obtained in which the mixture of finely divided raw ore and finely divided carbonizing material are forced upwardly through the tubes in a step by step fashion at an angle of approximately 45° to a horizontal plane passing through the tube as shown in the drawings. See particularly FIGS. 3 and 4. By means of the regulated pressure of the hot gas flow rate, the mixture of finely divided ore and carbonaceous material takes on a gurgitating action with the mixture passing from one side of each of the tubes to the other and ascending at an angle of approximately 45° to a horizontal plane through each of the tubes. The ascending planes of the mixture of finely divided ore and carbonaceous material are connected or are interlaced with each other which enables an effective reducing action of the ascending gases upon the ore and minimizes or prevents agglomeration of the finely divided reduced material to the inner walls of the tubes.

During the passage of finely divided iron and finely divided carbonaceous material and the mixture of carbon monoxide and carbon dioxide gases through the tubular section of the reactor, most of the carbon dioxide gas is converted into carbon monoxide gas in the lower portion of the reactor, the gangue of the ore and the ash of the carbonaceous material is converted into metallic silicates and aluminates and most of the iron oxide is reduced to the metallic state although some ferrous oxide will be present. In my improved proces, the iron ore is reduced at a lower temperature than in a blast furnace because a higher concentration of carbon monoxide is present than in the blast furnace.

As shown in the drawings, my inproved reactor consists of a lower conical section 14 which consists of a metal shell lined with refractory material and a cylindrical portion 47 which is also composed of a metal shell lined with refractoy material and which is provided with expansion joints. A convex section 84 formed of refractory material overlies the lower inclined housing 14 and is provided with openings to receive refractory inserts, each of which has an unwardly extending shoulder collar 85 which receives the lower end of a tube 8. In a like manner, the upper portion of the reactor is provided with a convex section 86 provided with a plurality of openings, each of which has an insert 87 therein that loosely receives the upper portion of one of the tubes 8. Tubes 8 are preferably formed of a high heat resistant alloy having a smooth bore. While the bore of the tubes may vary, tubes having a diameter of approximately 4 to 6 inches have proven satisfactory.

As previously stated, reduced ore consisting principally of finely divided iron and gangue but which contains some iron oxide passes to hearth 2 through pipe 30 and the hot gases which consist principally of carbon monoxide but which contains some carbon dioxide pass to hearth 3. The reduced material is melted in hearth 2 and the gangue being less dense than the iron floats on top of the molten bath an indicated by the numeral 88.

The gases in hearth 2 are neutral toward the siliceous residue from the ore and the charcoal ash with a carbon coating. $CO_2$ liberated by the decomposing limestone passes out from furnace 2 to the reactor and is converted in the hot section of the reactor to CO.

Gangue of ore and ash of charcoal are converted to metallic silicates and aluminates by addition of lime in suitable proportions. Gangue occurs in hearth 2 only. Charcoal dust or ash occurs in both hearths. The dust or ash in hearth 3, however, is caried from the hearth by the carbon monoxide gas.

The fusion of the partly carburized sponge FeO requires a temperature of approximately 2500° F. The ash of the charcoal reaches hearth 2 unchanged on account of its protective coating of carbon but as soon as the corbon is burned away, the ash unites with the balance of the lime and joins the accumulating cinder.

As shown, the flux is present in a container 89 having an inclined bottom portion provided with a gate 90 which leads into an airtight container 91 in which a belt 92 is trained around rollers. The container 91 is connected to the upper portion of a chute 93, the lower portion of which extends into hearth 2. It will of course be understood that if the slag is predominantly basic, instead of adding lime or limestone, silica will be added as the flux. The belt 92 is provided with a scale 94 and a tachometer 95. It is essential that the slag be of such composition that it will flow freely at a temperature readily attained in the hearths. When the hearths are in operation and run regularly, a minor adjustment of the charge may be made by observaton. For instance, if it becomes necessary to use a new ore which contains more silica than the ore previously used, the flux may be increased by an estimated amount. For controlling the amount of flux, dual impulses pass from scale 94 and tachometer 95 through conductor 96 to the flux recording controller 97.

Hearth 2 is provided with a slag notch 99 through which molten slag flows from hearth 2 to a vessel, such as a slag car. A thermocouple 100 is arranged in the slag notch from which a conductor 101 leads to a temperature recorder controller 102 and a ratio setting controller 103 is arranged between the temperature recording controller 102 and the flux recording controller 97 which may be manually set. According to my invention liquid slag is discharged continuously from the slag notch. A sufficient amount of slag, however, is maintained in hearth 2 to flux out impurities. Various slag properties are maintained in the slag by means of the ratio setting controller 103 and the slag fluidity is maintained in conjunction with "Ray-O-Tube" device 104 directed on the slag flow and electrically connected through conductor 105 with the ore recorder controller 81.

In a like manner, the molten iron flows continuously from hearth 2 through the iron notch 106 into a vessel, such as a hot metal car 107 and a "Ray-O-Tube" device 110 is directed upon the molten iron and is electrically connected through a conductor 111 to the ore recorder controller 81.

When charcoal is utilized as the reducing agent, there is practically no sulphur in the charge and the silica may be present in amounts ranging from approximately 1.5 to 2 times the lime present. A phenomenon of the action of the carbon monoxide upon ores in this process is the isolation of carbon and is due to the power of FeO and the lower oxides of iron to split up CO into carbon dioxide and carbon according to the reaction:

$$2CO \rightarrow CO_2 + C$$

and the separated carbon is deposited as a fine dust on the metallic sponge FeO. In this reaction the iron acts only as a catalyst since it does not enter into the reaction but only facilitates it.

Although my improved system and process may be applied to natural or beneficiated iron ores of various types, the following specific example will serve to illustrate and explain my invention. A finely divided hematite iron ore having the following composition:

| | Percent |
|---|---|
| $Fe_2O_3$ | 76.08 |
| $SiO_2$ | 11.10 |
| $Al_2O_3$ | 4.27 |
| MnO | 3.25 |
| $P_2O_5$ | 3.10 |
| $H_2O$ | 2.20 | was mixed with approximately 10% by weight of finely divided charcoal and the mixture was forced into the lower inverted conical housing of the reactor. The turbine 17 which operates the blower and which is connected through conductor 108 to the gas pressure controller 109 was set to discharge the hot gas mixture consisting principally of carbon monoxide gas and a small proportion of carbon dioxide gas into the tuyeres 13 at a pressure of approximately ten pounds per square inch which produced a "Jacob's ladder" effect in the tubes of the reactor. Charcoal was added to hearth 3 to provide carbon monoxide gas. The finally reduced material passing into hearth 2 from the reactor 1 was melted in hearth 2 and sufficient limestone was passed into hearth 2 to react with the gangue. The pig iron produced had approximately the following composition:

| | Percent |
|---|---|
| Iron | 92.67 |
| Silicon | 3.30 |
| Phosphorus | .03 |
| Carbon | 4.00 |

What I claim is:

1. The process of reducing iron ore and separating it from its gangue which comprises introducing a solid carbonaceous material into a substantially closed first hearth containing molten iron which is interconnected with a second hearth containing molten iron and slag, inductively heating the iron in said hearths to maintain the iron in a molten state, drawing the carbonaceous gases formed in said hearths from the hearths and forcing the hot mixture of carbonaceous gases through a mixture of finely divided iron ore and finely divided carbonaceous material with sufficient speed to force the finely divided mixture of iron ore and carbonaceous material through the tubes of a reactor to reduce the iron ore and separate it from its gangue and then separating the iron and gangue from the carbonaceous gases and passing the carbonaceous gases to the first hearth.

2. The process of reducing iron ore and separating it from its gangue which comprises forcing a finely divided mixture of iron ore and a carbonaceous material in which the carbonaceous material is present in an amount sufficient to coat any siliceous material in the ore, into the lower housing of a reactor having a plurality of elongated tubes connected thereto and extending upwardly therefrom, each of which has a diameter of approximately four to six inches, externally heating said tubes and forcing a gas composed essentially of carbon monoxide which is at a sufficiently high temperature to separate the iron from its gangue and to reduce a substantial portion of the iron ore to its metallic state through the finely divided mixture of iron ore and the carbonaceous material in the lower housing and upwardly through the tubes at a pressure ranging from approximately 10 to 35 pounds per square inch and sufficient to force the finely divided mixture of iron ore and carbonaceous material upwardly through the tubes.

3. The process of reducing iron ore and separating it from its gangue which comprises forcing a mixture composed essentially of finely divided iron ore and a carbonaceous material in which the carbonaceous material is present in an amount sufficient to coat any siliceous material in the ore, into the lower housing of a reactor having a plurality of elongated tubes connected thereto and extending upwardly therefrom, each of which tubes has a diameter of approximately four to six inches, externally heating said tubes, forcing a gas composed essentially of carbon monoxide at a temperature of approximately 1750° to 1800° F. into the lower housing and upwardly through said tubes at a pressure ranging from approximately ten to thirty-five pounds per square inch and sufficient to force the finely divided mixture of iron ore and carbonaceous material upwardly through the tubes.

4. The process of reducing iron ore and separating it from its gangue which comprises introducing charcoal into a substantially closed first hearth containing molten iron which is interconnected with a second substantially closed hearth containing both molten iron and a slag, inductively heating the iron in said hearths to maintain the iron in a molten state, drawing hot carbon monoxide gas from the first hearth and a mixture of carbon monoxide and carbon dioxide gases from the second hearth, passing the mixture of carbonaceous gases around a plurality of tubes extending upwardly in a closed housing, each of which has a diameter ranging from approximately four to six inches, blowing the mixture of hot carbonaceous gases at a temperature of approximately 1750° to 1800° F. through a mixture consisting of finely divided iron ore and charcoal in which the charcoal is present in an amount sufficient to coat any siliceous material in the ore, and then upwardly through said tubes at a pressure ranging from approximately 10 to 35 pounds per square inch and sufficient to force the finely divided mixture of iron ore and charcoal upwardly through the tubes, separating the finely divided solid products from the carbonaceous gases and passing them to the second hearth, and then passing the carbonaceous gases from which the solid products have been separated to the first hearth.

5. The process as defined in claim 4 including the step of continually delivering a flux to the second hearth during the process.

6. The process as defined in claim 5 including the step of continually draining molten slag and molten iron from the second hearth during the process.

7. The process of reducing iron ore and separating it from its gangue which comprises forcing a finely divided mixture of iron ore and carbonaceous material in which the carbonaceous material is present in an amount sufficient to coat any siliceous material in the ore, into the lower housing of a reactor having a plurality of elongated tubes connected thereto and extending upwardly therefrom, each of which tubes has a diameter of approximately four to six inches, passing a carbonaceous gas composed predominantly of carbon monoxide at a temperature of approximately 2100° F. through a housing surrounding the tubes to externally heat the tubes and then blowing the carbonaceous gas through the mixture of iron ore and carbonaceous material at a temperature of approximately 1750° to 1800° F. and at a pressure ranging from approximately 10 to 35 pounds per square inch and sufficient to force the finely divided mixture of iron ore and carbonaceous material upwardly through the tubes.

8. A system for the direct reduction of iron ore including first and second interconnected hearths, each of which contains iron, means for inductively heating the iron in each hearth to maintain it in a molten state, means for introducing a carbonaceous material into the first hearth for carburizing the metal therein and for producing hot carbon monoxide gas, a reactor having a bottom portion and a tubular section, means for forcing a mixture of finely divided iron ore and carbonaceous material into the bottom portion of the reactor, means for conducting the hot carbon monoxide gas into the bottom portion of the reactor under sufficient pressure to blow the mixture of the finely divided iron ore and carbonaceous material through the tubular section of the reactor to reduce the iron ore and separate it from its gangue, conduit means communicating with the upper portion of the reactor and the second hearth through which the solid products of the reaction are passed from the reactor to the second hearth, means for providing a flux for the slag in the second hearth, and means whereby the slag and molten metal may be separately removed from the second hearth.

9. A system as defined in claim 8 in which conduit means are provided for connecting the hearths together at their lower portions.

10. A system as defined in claim 8 in which conduit means are provided to connect the hearths together at their lower portions through which the carbon in the form of iron carbide in the first hearth passes from the first hearth into the second hearth and reacts with the gangue in the second hearth to generate carbon dioxide, and means in combination with the system defined in claim 1 for mixing the carbon dioxide generated in the second hearth with the carbon monoxide generated in the first hearth and for conducting the mixture to the lower portion of the tubular section of the reactor.

11. A system for the direct reduction of iron ore including a reactor comprising a lower housing, a central portion, and conduit means leading from its upper portion, a plurality of tubes arranged in the central portion of the reactor, the lower end of each of which communicates with the lower housing and the upper end of each of which communicates with said conduit means, means for generating hot carbon monoxide gas in said system, means for forcing a finely divided mixture of iron ore and a carbonaceous material into the lower housing of the reactor, and means for blowing the hot carbon monoxide gas into said housing under pressure to force the mixture of finely divided carbonaceous material and iron ore and said carbon monoxide gas upwardly through said tubes to thereby cause a reaction between the carbon monoxide and the finely divided iron ore.

12. A system for the direct reduction of iron ore including a reactor having a lower housing and conduit means leading from its upper portion, a tubular section having a plurality of tubes arranged therein, the lower end of each of which communicates with the lower housing and the upper end of each of which communicates with said conduit means, means for generating hot carbon monoxide gas in said system, means whereby said carbon monoxide gas may be conducted into the lower portion of the tubular section of said reactor, means for forcing a mixture of finely divided ore and a finely divided carbonaceous material into said housing, a rotative blower having its inlet side communicating with the upper portion of said reactor and its outlet side communicating with said housing, and means whereby said blower may be set to rotate at such speed that it will draw carbon monoxide gas through said reactor to externally heat said tubes and will force the hot carbon monoxide gas into said housing with sufficient speed to propel a mixture of said finely divided ore and carbonaceous material upwardly through said tubes to thereby reduce the iron ore and to separate it from its gangue.

13. A substantially closed system for the direct reduction of iron ore including a reactor consisting of a lower housing and a tubular section having a plurality of tubes therein, first and second interconnected hearths containing iron and the second hearth also containing slag, means for inductively heating the iron in said hearths to maintain the iron in a molten state, first conduit means leading from said hearths to the lower portion of the tubular section of said reactor, a blower having an inlet side communicating with the upper portion of said reactor and an outlet side communicating with the housing of said reactor, second conduit means communicating with the upper portion of said reactor and with the first hearth, means for introducing a carbonaceous material in the first hearth to generate carbon monoxide gas therein and to provide carbon which dissolves in the iron and migrates to the second furance and reacts with the iron oxide and with the slag to form a mixture of carbon monoxide and carbon dioxide gases, means for forcing a finely divided mixture of iron ore and carbonaceous material into the housing of said reactor, said blower being effective when set to rotate at a predetermined speed in drawing hot carbon monoxide from the first hearth and a mixture of hot carbon monoxide and hot carbon dioxide gases from the second hearth through the conduit means leading from the hearths to the lower portion of the reactor and conducting the mixture of carbonaceous gases around the tubes in said reactor to externally heat them and in blowing the mixture of the hot carbonaceous gases into the lower housing of the reactor at sufficient speed to blow the mixture of iron ore and carbonaceous material up through said tubes to reduce a substantial amount of the iron oxides in the ore to iron and to separate the gangue from the ore, and to force the mixture of gases consisting principally of carbon monoxide back to the first hearth, means arranged in the second conduit means for separating solid particles consisting principally of iron but containing some iron oxide, and the gangue from the gas stream, and means for conducting the separated particles to the second hearth to provide additional iron and slag to be melted.

14. A system as defined in claim 13 in which means are provided for introducing a flux into the second hearth.

15. A system as defined in claim 13 in which means are also provided for regulating the amount of carbonaceous material that is added to the first hearth.

16. A system as defined in claim 13 in which means is provided to regulate the proportions of the finely divided iron and finely divided carbonaceous material that is forced into the housing of the reactor.

17. A system for the direct reduction of iron ore including a reactor having a lower housing and a cylindrical portion having its lower end connected to the lower housing, conduit means connected to the upper end of the cylindrical portion, a plurality of elongated tubes arranged within the cylindrical portion of the reactor, each of which has a diameter of approximately four to six inches, means for externally heating said tubes, and the lower end of each of which tubes communicates with the lower housing and the upper end of each of which tubes communicates with said conduit means, means for forcing within the lower housing a finely divided mixture of iron ore and a carbonaceous material, and means for blowing a gas consisting predominantly of carbon monoxide through the mixture of iron ore and carbonaceous material in the lower housing at such pressure that the mixture of iron and carbonaceous material is forced upwardly through the tubes.

18. A system for the direct reduction of iron ore containing iron oxides and associated gangue, said system including a reactor having a lower housing, a cylindrical portion having its lower end connected to the lower housing and conduit means connected to the upper end of the cylindrical portion, a plurality of tubes arranged in the cylindrical portion of the reactor, each of which has a diameter of approximately four to six inches and the lower end of each of which tubes communicates with the lower housing and the upper end of each of which tubes communicates with said conduit means, means for externally heating said tubes, means for generating a hot carbon monoxide gas in said system, means for forcing a finely divided mixture of iron ore and carbonaceous material into the lower housing of the reactor, and means for blowing said carbon monoxide gas through the mixture of iron ore and carbonaceous material at such pressure that the finely divided mixture of iron ore and carbonaceous material is forced upwardly through the tubes.

19. A system for the direct reduction of iron ore including a reactor having a lower housing, a cylindrical portion having its lower end connected to the lower housing, and conduit means connected to the upper end of the cylindrical portion, a plurality of elongated tubes arranged within the cylindrical portion of the reactor, each of which has a diameter of approximately four to six inches and the lower end of each of which tubes communicates with the lower housing and the upper end of each of which tubes communicates with said conduit means, means for forcing within the lower housing of the reactor a finely divided mixture of iron ore and a carbonaceous material, and means for drawing a carbonaceous gas consisting predominantly of carbon monoxide into the cylindrical portion of said housing to externally heat said tubes and then blowing it through the finely divided mixture of iron ore and carbonaceous material and upwardly through the tubes at sufficient pressure to force the finely divided mixture of iron ore and carbonaceous material upwardly through the tubes.

References Cited by the Examiner

UNITED STATES PATENTS

| | | | |
|---|---|---|---|
| 608,779 | 8/1898 | Karyscheff | 75—40 |
| 1,796,871 | 3/1931 | Madorsky | 75—40 |
| 2,343,780 | 3/1944 | Lewis | 75—26 |
| 2,399,984 | 5/1946 | Caldwell | 75—26 |
| 2,403,715 | 7/1946 | Gallusser | 75—11 |
| 2,638,407 | 5/1953 | Steeves | 23—288.92 |
| 2,674,612 | 4/1954 | Murphree | 23—288.35 |
| 3,092,490 | 6/1963 | Ednie | 75—26 |

DAVID L. RECK, *Primary Examiner.*